United States Patent [19]
Voith et al.

[11] Patent Number: 5,751,741
[45] Date of Patent: May 12, 1998

[54] RATE-ADAPTED COMMUNICATION SYSTEM AND METHOD FOR EFFICIENT BUFFER UTILIZATION THEREOF

[75] Inventors: Raymond Paul Voith; Sujit Sudhaman; George Hoekstra, all of Austin, Tex.

[73] Assignee: Motorola, Inc., Schaumburg, Ill.

[21] Appl. No.: 754,768

[22] Filed: Nov. 20, 1996

[51] Int. Cl.[6] .................................................. H03M 13/22
[52] U.S. Cl. .......................... 371/37.7; 370/914; 371/2.2; 371/37.02
[58] Field of Search .......................... 371/37.02, 2.2, 371/37.7; 370/914

[56] References Cited

U.S. PATENT DOCUMENTS

| | | | |
|---|---|---|---|
| 5,596,604 | 1/1997 | Cioffi et al. | 345/260 |
| 5,636,224 | 6/1997 | Voith et al. | 371/2.1 |

OTHER PUBLICATIONS

American Nat'l. Standards Institute, Inc., "Asymmetric Digital Subscriber Line (ADSL) Metallic Interface", American Nat'l. Standards Inst. Inc., Network and Customer Installation Interfaces, pp. 1–170.

Primary Examiner—Stephen M. Baker
Attorney, Agent, or Firm—Daniel D. Hill; Paul J. Polansky

[57] ABSTRACT

A transceiver (34) includes a rate adaptation buffer (74) that synchronizes a data stream received at a 4.0 kHz rate to a data stream that is transmitted at a 4.05 kHz rate. A transmit section (62) of the transceiver (34) performs rate adaptation using a single rate adaptation buffer. The transmit section (62) includes four autonomous modules which are able to access the data in the rate adaptation buffer (74) independently of one another. These four modules include a CRC-scrambler (72), a FEC encoder (76), an interleaver (78), and a constellation encoder (80). A timing controller (84) prevents contention for accesses to the rate adaptation buffer (74). In addition, each of the four modules perform their respective functions quickly enough to prevent overflow or underflow conditions in the rate adaptation buffer (74). A receive section (64) functions similarly to the transmit section (62).

18 Claims, 6 Drawing Sheets

RATE-ADAPTED COMMUNICATION SYSTEM AND METHOD FOR EFFICIENT BUFFER UTILIZATION THEREOF

FIELD OF THE INVENTION

This invention relates generally to communications, and more particularly, to communications systems requiring rate adaptation.

BACKGROUND OF THE INVENTION

As the complexity of communication systems increases, there is more and more need for additional ways of transmitting information. One method of communication is called Asymmetrical Digital Subscriber Line (ADSL) and is a transmission scheme that allows for the provision of plain old telephone service (POTS) and a variety of digital channels on two wire twisted metallic wire pair with mixed gauges. It is desirable to use such twisted pair wire as there is an existing infrastructure, the use of which will reduce installation costs. ADSL standards are proposed in the draft American National Standard for Telecommunication—Network and Customer Interfaces—Asymmetric Digital Subscriber Line (ADSL) metallic interface, T1E1.4/95-007R2, ADSL coding standard, draft, Aug. 15, 1995.

Discrete multi-tone (DMT) is a multi-carrier technique which divides the available bandwidth of twisted-pair copper media connections into mini-subchannels or bins. The DMT technique has been proposed for adoption by the ANSI T1E1.4 (ADSL) committee to be used in ADSL communications systems. In the proposed ADSL standard, T1E1.4 DMT is used to generate 250 separate 4.3125 kilohertz (kHz) subchannels from 26 kilohertz to 1.1 megahertz (MHz) for downstream transmission to an end user. Likewise, DMT is used to generate 26 subchannels from 26 kilohertz to 138 kilohertz for upstream transmission by an end user. The asymmetric transmission protocol implemented by the proposed ADSL standard requires a higher rate of data transmission from a central office to a remote terminal and a lower rate of data transmission from a remote terminal to a central office. As a result, different processing sequences are required at the remote terminal and central office ends.

One of the advantages of ADSL transmission is that it may be used to provide high quality, multiple and simultaneous interactive video services over an ordinary telephone line without disruption of the standard telephone service.

In ADSL, data may be received from (and provided to) several channels and the data is grouped into structures known as frames. Each frame includes both payload data bytes and overhead bytes. Data from each channel is placed in different positions in the frame depending on whether it is interleaved or non-interleaved. In general, for transmission, the ADSL equipment must assemble the payload data from the channels into a frame and append the overhead bytes as appropriate. In particular, the ADSL equipment must perform a cyclic redundancy check (CRC), scramble, interleave (if selected), and perform forward error correction coding (FEC) on frame data. Once the transmit data and overhead bytes are assembled into a frame, the ADSL equipment must convert the frame data into a set of complex symbols. Each symbol represents a number of frame bits as defined by a bit allocation table. These complex symbols are subsequently converted into an analog signal transmitted on the telephone line. Conversely, when receiving an analog signal from the telephone line, the ADSL equipment must convert the analog signal into complex digital symbols, convert the complex symbols into a receive frame, and perform deinterleaving, FEC, CRC, and descrambling to convert the received frame into recovered payload data.

The frames in turn are grouped together into a "superframe" which includes 68 data frames plus an additional synchronization frame. CRC calculation is performed on all the data in the 68 data frames of a superframe, and the CRC calculated for a prior superframe is transmitted in the overhead bytes of the first frame of the next superframe. The synchronization frame is a special frame which the ADSL equipment uses to delineate the boundary of a superframe.

The existence of the synchronization frame creates a rate adaptation problem with the ADSL equipment. On the transmit side, 68 frames of transmit data are gathered in 17 milliseconds (ms), but symbols corresponding to 69 frames (68 frames plus the synchronization frame) are transmitted on the telephone line in the same amount of time. Similarly on the receive side, symbols corresponding to 69 frames of receive data (68 frames plus the synchronization frame) are received from the telephone line in 17 microseconds but only 68 frames are processed in the same amount of time. One way of solving this problem is to add a large buffer area so that while the supplier of data is filling one part of the buffer from one side, the consumer of data is emptying another part of buffer from the other side. However, large buffers consume a large integrated circuit area which adds to its cost. Another problem is that the ADSL equipment must perform all the functions required quickly enough to avoid overflow and underflow conditions. The present invention overcomes these problems by providing an efficient ADSL apparatus, whose features and advantages will be more clearly understood by reference to the Detailed Description in conjunction with the accompanying drawings.

DESCRIPTION OF A PREFERRED EMBODIMENT

Generally, the present invention provides an ADSL transceiver having a rate adaptation buffer that synchronizes a data stream received at a 4.0 kHz rate to a data stream that is transmitted at a 4.05 kHz rate. A transmit section of the transceiver is able to perform this rate adaptation using a single rate adaptation buffer, without the need for multiple frame buffering as in known rate adaptation techniques. The transmit section includes four autonomous modules which are able to access the data in the rate adaptation buffer independently of one another. These four modules include a CRC-scrambler, a FEC encoder, an interleaver, and a constellation encoder. Timing control prevents contention for accesses to the rate adaptation buffer. In addition, each of the four modules perform their respective functions quickly enough to prevent overflow or underflow conditions in the rate adaptation buffer.

In a receive section of the transceiver, rate adaptation is performed in a manner similar to that of the transmit section, except that there are stricter timing constraints. Because some of the receive processing tasks cannot be completed until the whole frame is available, the receive section requires a minimum of three rate adaptation buffers. Similarly to the transmit section, four modules in the receive section are each independent from each other in the sense that they are all able to address the rate adaptation buffer. The four modules include a deinterleaver, an FEC decoder, a CRC-descrambler, and a constellation decoder. A timing and control section prevents contention between the four modules.

This allows the synchronization of the 4.0 kHz rate of a superframe having 68 frames to the 4.05 kHz rate of a superframe having 69 frames (68 payload frames plus a synchronization frame) without using a large amount of memory. Thus, the size and cost required to implement the ADSL transceiver is reduced.

Figure 1:
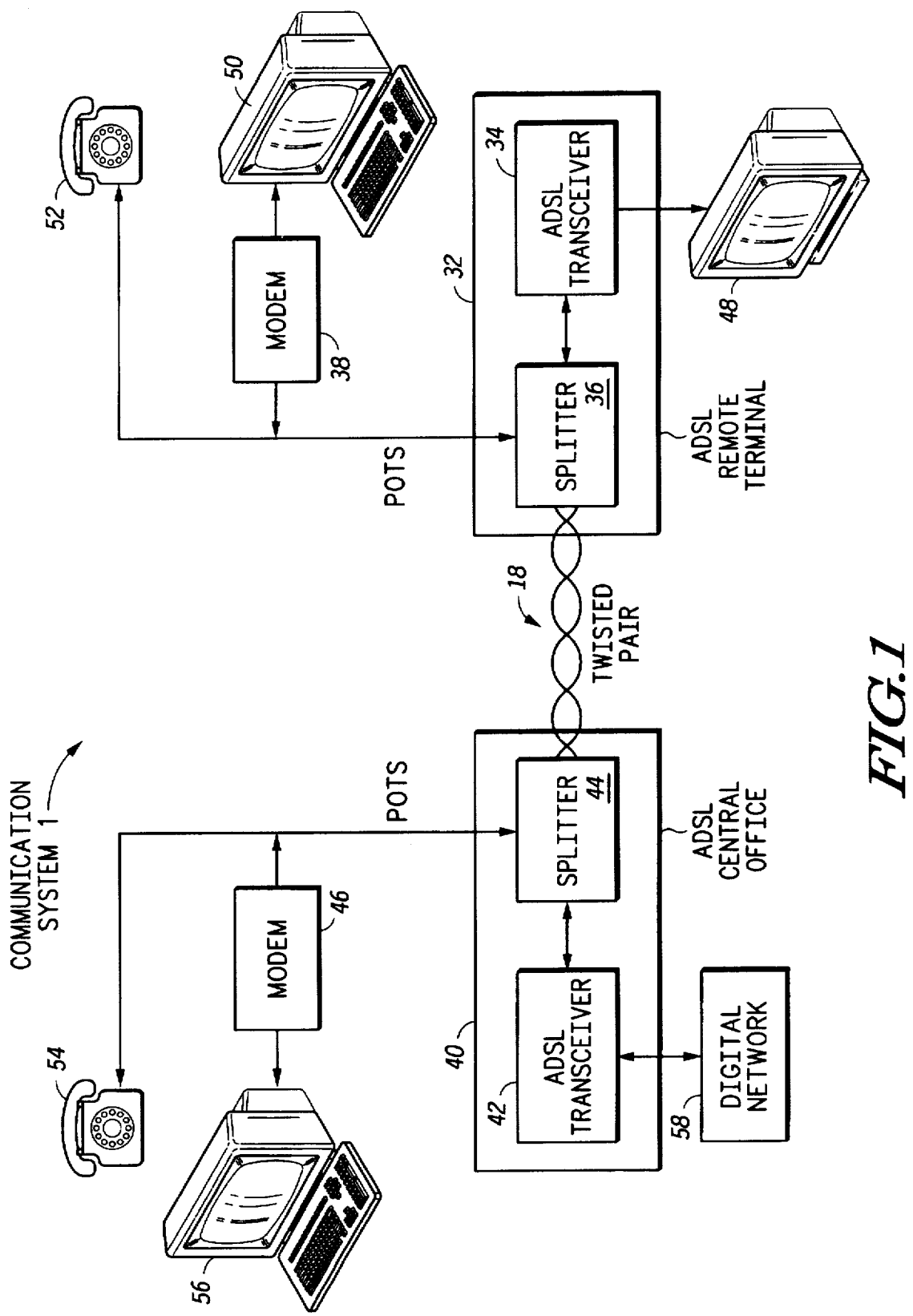
FIG. 1 illustrates, in block diagram form, an asymmetrical digital subscriber line (ADSL) communication system in accordance with one embodiment of the present invention.

FIG. 1 illustrates a communication system 1, according to one embodiment of the present invention, having an ADSL remote terminal 32 and an ADSL central office 40. ADSL central office 40 contains ADSL transceiver 42 and splitter 44. ADSL central office 40 is coupled to ADSL remote terminal 32 by way of twisted pair 18. ADSL remote terminal 32 includes splitter 36 and ADSL transceiver 34.

ADSL transceiver 42 is bi-directionally coupled to splitter 44, and is additionally bi-directionally coupled externally to digital network 58. ADSL transceiver 34 is bi-directionally coupled to splitter 36, and is additionally coupled to external devices 48. Splitter 44 is bi-directionally coupled to telephone 54, while splitter 36 is bi-directionally coupled to telephone 52. Splitter 44 is additionally coupled to modem 46 and splitter 36 is coupled to modem 38. Modem 38 is further coupled to external terminals 50 and modem 46 is coupled to external terminals 56.

Communication system 1 is an example of a digital communication network, where the digital network allows communication between a variety of users having computers, telephones, fax machines, modems, television sets, and any number of other communication devices. Digital network 58 is used to transmit such a variety of information, each of which has a different transmission format and frequency.

Figure 2:
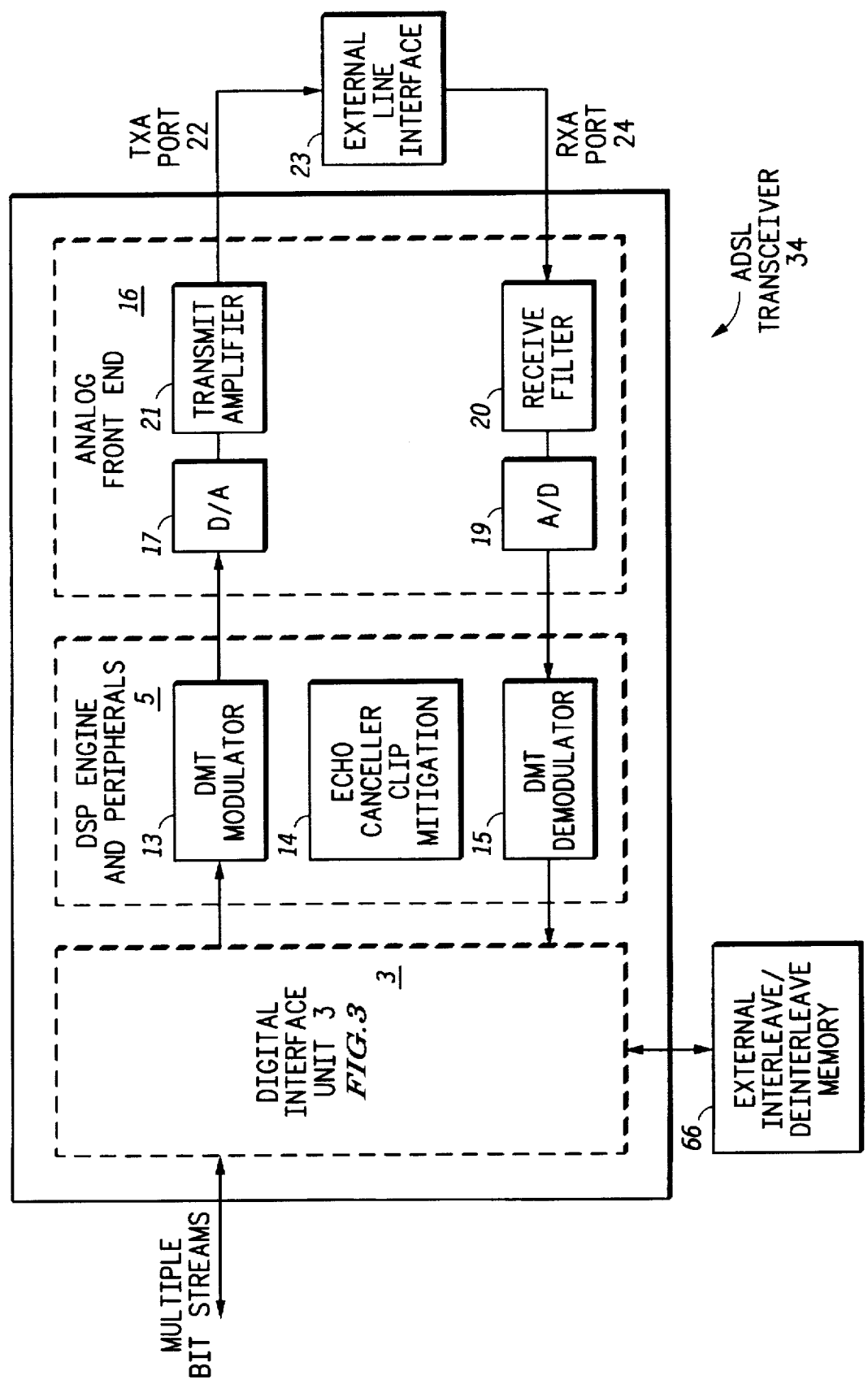
FIG. 2 illustrates, in block diagram form, the ADSL transceiver of FIG. 1.

FIG. 2 illustrates ADSL transceiver 34 of FIG. 1, along with an external interleave/de-interleave memory 66. Here, ADSL transceiver 34 may be a single chip embodiment and is substantially the same as ADSL transceiver 42. Referring to FIG. 2, ADSL transceiver 34 includes digital interface unit 3, which is coupled to digital signal processing (DSP) engine and peripherals 5. Further, DSP engine and peripherals 5 is coupled to analog front end 16. Digital interface unit 3 is bi-directionally coupled to receive signals labeled "MULTIPLE BIT STREAMS", and is bi-directionally coupled to an external interleave/deinterleave memory 66.

Analog front end 16 contains analog/digital converter (A/D) 19 which is coupled to receive filter 20. Analog front end 16 further includes transmit amplifier 21 which is coupled to digital/analog converter (D/A) 17. Transmit amplifier 21 is further coupled to TXA port 22. Receive filter 20 is coupled to port 24. RXA port 22 is then coupled to external line interface 23. External line interface 23 is coupled to both ports 22 and 24.

DSP engine and peripherals 5 includes a digital signal processor and firmware necessary to perform various signal processing functions. These functions include a DMT modulator 13, an echo canceller clip mitigation 14, and a DMT demodulator as illustrated in FIG. 2. DMT modulator 13 has an input coupled to digital interface unit 3, and an output coupled to D/A converter 17. DMT demodulator 15 has an input coupled to A/D converter 19, and an output coupled to digital interface unit 3. Echo cancellation clip mitigation 14 is an additional signal processing function performed by DSP engine and peripherals 5, and these functions are performed on both the transmit and receive sides by subtracting echo terms of one path from the signal in the other path.

Digital interface unit 3 includes a bidirectional port for receiving and transmitting payload data, which is labeled "MULTIPLE BIT STREAMS" in FIG. 2. When receiving data for transmission, digital interface unit 3 receives transmit payload data from the MULTIPLE BIT STREAMS and outputs sets of complex symbols to DMT modulator 13. Similarly, digital interface unit 3 receives sets of complex symbols from DMT demodulator 15 and outputs receive payload data to the MULTIPLE BIT STREAMS. As part of the ADSL task, digital interface unit 3 also interleaves transmit data and de-interleaves receive data. In order to perform these complex functions, ADSL transceiver 34 requires a large amount of memory, which is preferably implemented off-chip in external interleave/de-interleave memory 66. Also, in order to minimize the number of integrated circuit pins required to access external memory, the interleave and de-interleave buffers are also preferably implemented in the same physical memory and digital interface unit 3 preferably multiplexes between interleaving and de-interleaving operations.

Figure 3:
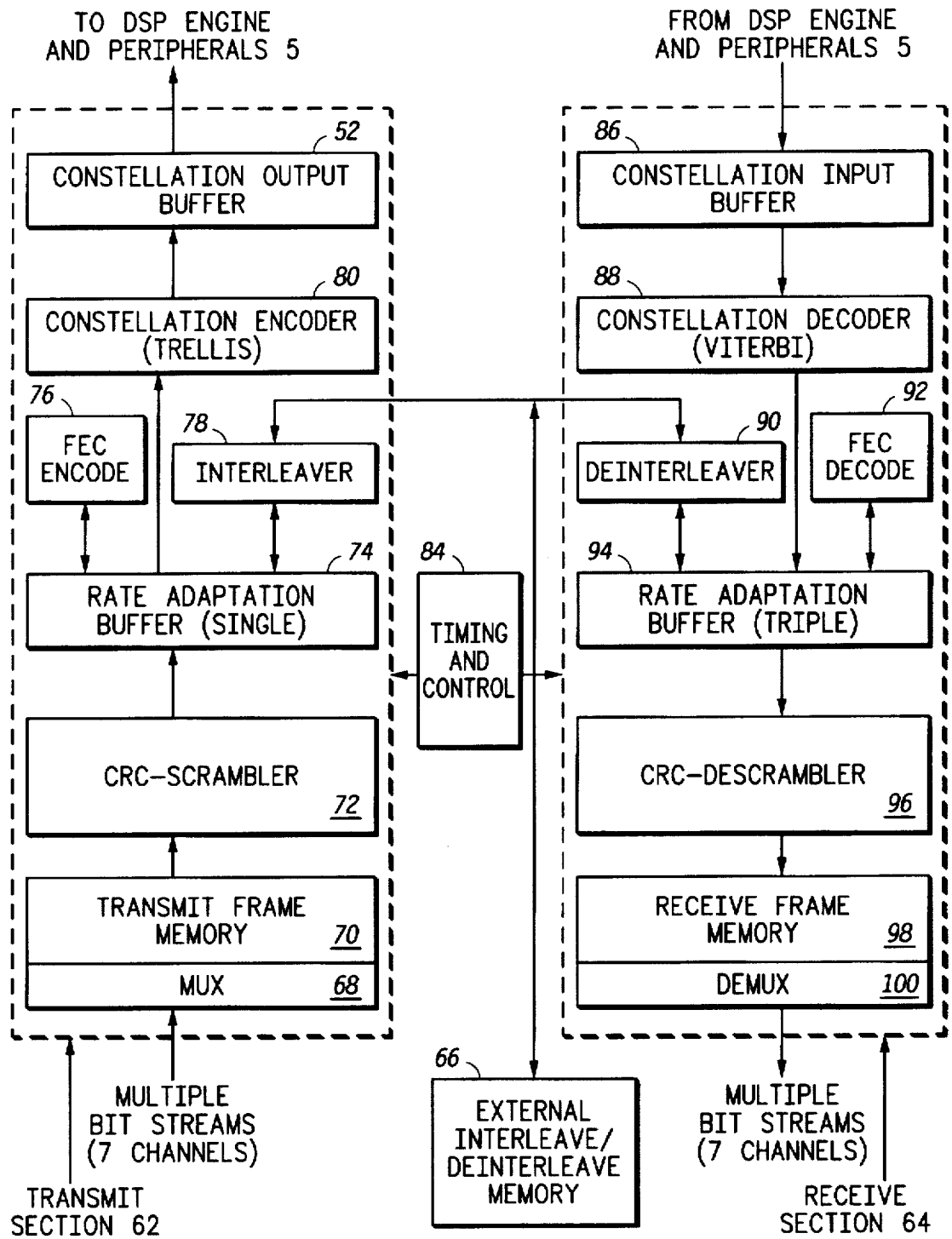
FIG. 3 illustrates, in block diagram form, the digital interface of FIG. 2.

The operation of digital interface unit 3 is understood with reference to FIG. 3, which illustrates digital interface unit 3 in block diagram form. Digital interface unit 3 generally includes a transmit section 62, a receive section 64, and common timing and control portion 84 which coordinates the operation between the two sections. Also illustrated in FIG. 3 is an external interleave/de-interleave memory 66, which is used by both transmit section 62 and receive section 64.

Timing control block 84 generates timing signals which are necessary for the signal processing functions. Timing control block 84 also coordinates the activities of several modules in both the transmit and receive path so that their activities do not conflict. Furthermore, timing control block 84 includes a memory arbitrator that arbitrates between the transmit and receive path for access to external interleave/deinterleave memory 66.

The operation of digital interface unit 3 is better understood first by examining transmit section 62. Transmit section 62 includes a multiplexer (MUX) 68, a transmit frame memory 70, a CRC-scrambler 72, a rate adaptation buffer 74, an FEC encode block 76, an interleaver 78, a constellation encoder 80, and a constellation output buffer 82. MUX 68 has an input for receiving the MULTIPLE BIT STREAMS and is coupled to transmit frame memory 70. Transmit frame memory 70 has an input coupled to MUX 68, and an output. CRC-scrambler 72 has an input connected to transmit frame memory 70, and an output. Rate adaptation buffer 74 has an input connected to the output of CRC-scrambler 72, two bi-directional connections to FEC encode 76 and interleaver 78, and an output connected to constellation encoder 80. Interleaver 78 also has a second bidirectional terminal connected to external interleave/deinterleave memory 66. Constellation encoder 80 has an input terminal connected to rate adaptation buffer 74, and an output connected to constellation output buffer 82. Constellation output buffer 82 has an output which is connected to DSP engine and peripherals 5 of FIG. 2.

Receive section 64 includes generally a constellation input buffer 86, a constellation decoder 88, a de-interleaver 90, an FEC decode 92, a rate adaptation buffer 94, a CRC-descrambler 96, a receive frame memory 98, and a demultiplexer (DEMUX) 100. Constellation input buffer 86 has an input connected to DSP engine and peripherals 5 of FIG. 2, and an output. Constellation decoder 88 has an input connected to the output of constellation input buffer 86, and an output. De-interleaver 90 has a first bidirectional terminal, and a second bidirectional terminal connected to external interleave/deinterleave memory 66. FEC decode 92 has a bidirectional terminal. Rate adaptation buffer 94 has an input terminal connected to the output terminal of constellation decoder 88, a first bi-directional terminal connected to the bi-directional terminal of deinterleaver 90, a second bidirectional terminal connected to the bi-directional terminal of FEC decode 92, and an output terminal. CRC-descrambler 96 has an input terminal connected to the output terminal of rate adaptation buffer 94, and an output terminal. Receive frame memory 98 has an input terminal connected to the output terminal of CRC-descrambler 96, and an output terminal connected to an input terminal of DEMUX 100. DEMUX 100 also has an output terminal which provides seven channels of data to the MULTIPLE BIT STREAMS. External interleave/deinterleave memory 66 has a bidirectional terminal coupled to the second bidirectional terminals of interleaver 78 and deinterleaver 90.

In operation, MUX 68 receives MULTIPLE BIT STREAMS which may be organized into a maximum of seven channels. Note that some of the channels need not be present in a particular application. These seven channels of payload data are then stored in corresponding portions of transmit frame memory 70. In addition, transmit frame memory 70 appends a FAST byte and a SYNC byte, defined by the ADSL standard, at the appropriate points in the frame. CRC-scrambler 72 then reads the corresponding portions of the frame from transmit frame memory 70. CRC-scrambler 72 performs an 8-bit cyclic redundancy check first on the fast data and then on the interleaved data. The scrambler function of CRC-scrambler 72 also operates first on the fast data and next on the interleaved data. CRC-scrambler 72 makes the modified transmit frame available to other signal processing blocks by writing it into rate adaptation buffer 74. In the illustrated embodiment, rate adaptation buffer 74 comprises a single static random access memory (SRAM).

FEC encode 76 performs a forward error correction encoding first on fast data and next on the interleaved data in the frame and appends redundancy bytes to the frame and stores those in appropriate portions of rate adaptation buffer 74. Interleaver 78 operates only on the interleave portion of the frame, and reads data out of rate adaptation buffer 74 and writes data back into rate adaptation buffer 74 after performing the interleaving operation. Because the interleaving operation requires a large amount of memory, interleaver 78 uses a portion of external interleave/deinterleave memory 66. Interleaver 78 arbitrates for use of external interleave/deinterleave memory 66 with deinterleaver 90 so that only one external memory interface using common integrated circuit pins is required. At the conclusion of the CRC-scrambling FEC encoding and interleaving operations, constellation encoder 80 reads data from rate adaptation buffer 74. Constellation encoder 80 encodes the data into complex symbols based on a bit allocation table, and may use the well-known trellis encoding method. The bit allocation table is determined at initialization between the central office and the remote terminal based on the characteristics of the transmission link. Constellation encoder 80 then provides the complex symbols to constellation output buffer 82 for further processing by DSP engine and peripherals 5.

In receive section 64, data in the form of sets of complex symbols are received from DSP engine and peripherals 5 which writes them into constellation input buffer 86. Constellation decoder 88 reads the complex symbols from constellation input buffer 86 and converts them into frame data based on a bit allocation table. In the illustrated embodiment, constellation decoder 88 includes the well-known Viterbi algorithm as an option. Note that other algorithms may also be used. Constellation decoder 88 then writes the frame data into rate adaptation buffer 94. A deinterleaver 90 performs a deinterleave operation on the interleaved portion of the received frame. Deinterleaver 90 makes use of external interleave/deinterleave memory 66 and arbitrates for usage thereof in a manner similar to interleaver 78. FEC decode 92 first performs an FEC decode operation on the fast portion of the frame data, and then performs an FEC decode operation on the interleaved portion of the frame data. If FEC decode 92 detects an error in the frame data, it performs correction within rate adaptation buffer 94. CRC-descrambler 96 reads the completed frame data out of rate adaptation buffer 94. CRC-descrambler 96 descrambles the frame data by first operating on the fast data and next on the interleaved data as well. CRC-descrambler 96 performs a CRC check on the fast data and next on the interleave data. CRC-descrambler 96 then writes the data into receive frame memory 98. The data in receive frame memory 98 is then output to the corresponding channel selected by DEMUX 100, which become part of the MULTIPLE BIT STREAMS.

Transmit section 62 is able to perform rate adaptation by receiving data at a 4 kilohertz rate from the MULTIPLE BIT STREAMS and providing data out of constellation output buffer 80 at a rate of 4.05 kilohertz for the frame. Transmit section 62 is able to perform this rate adaptation using only a single rate adaptation buffer 74 and without the need for multiple frame buffering as in known rate adaptation techniques. Transmit section 62 includes four autonomous modules which are able to access the data in rate adaptation buffer 74 independently of one another. These four modules include CRC-scrambler 72, FEC encoder 76, interleaver 78, and constellation encoder 80. Note that timing control 84 prevents contention for accesses to rate adaptation buffer 74. In addition, each of the four independent modules perform their respective functions quickly enough to prevent overflow or underflow conditions in rate adaptation buffer 74. The speed of these operations is facilitated by the use of independent modules which may each independently access rate adaptation buffer 74. As described herein, the term "independent" means that each module is capable of independently addressing needed data in rate adaptation buffer 74. However, timing and control 84 insures that there is no contention between the modules by allowing access to rate adaptation buffer 74 in a time sharing sense. The necessity of storing or receiving data at a four kilohertz frame rate and providing data at a 4.05 kilohertz rates creates constraints in the timing and sequence of operations of the various modules of transmit section 62. These timing constraints will be better understood with reference to both FIGS. 4 and 5.

In receive section 64 the rate adaptation problem is similar to that of the transmit side except there are stricter timing constraints. In the case of receive section 64, data is being provided from DSP and peripherals 5 at a rate of 4.05 kilohertz per frame into constellation input buffer 86. Because some of the receive processing tasks cannot be completed until the whole frame is available, receive section 64 requires a minimum of three frame buffers. Similarly to transmit section 62, in receive section 64, the four modules are each independent in the sense that they are all able to address rate adaptation buffer 64. But again, timing and control 84 must prevent contention. In addition, timing and control 84 must transfer data between the three frame buffers when particular signal processing functions have completed. These additional constraints will be better understood with reference to FIGS. 6 and 7 below.

Figure 4:
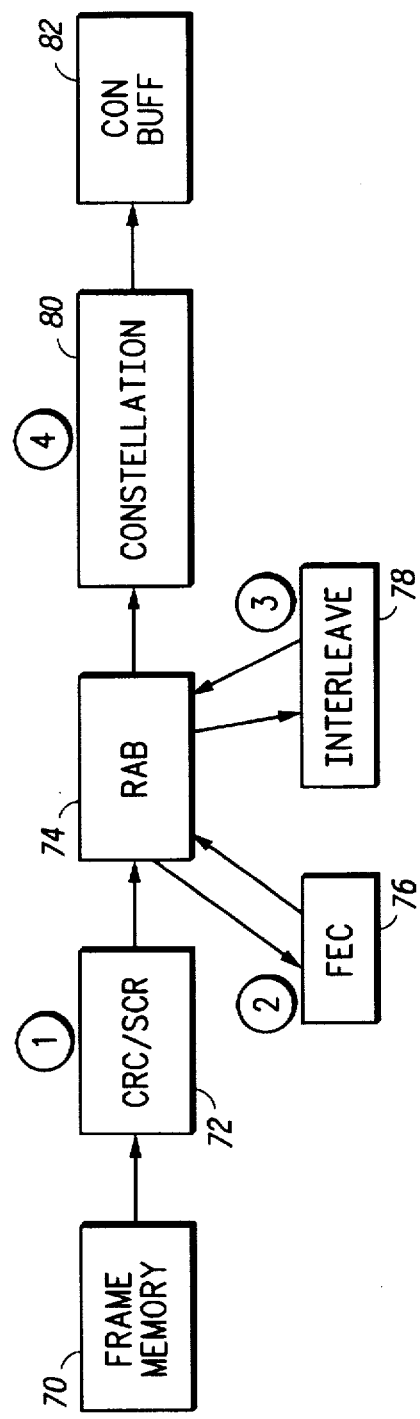
FIG. 4 illustrates, in block diagram form, the signal processing operations performed on the transmit rate adaptation buffer of FIG. 3.

FIG. 4 illustrates, in block diagram form, the functions performed by transmit section 62. FIG. 4 is useful in understanding the sequence of operations provided on data in transmit section 62. This sequence of processing will become helpful in the understanding of the timing constraints which will be explored further with reference to FIG. 5 below. In FIG. 4 proceeding from left to right, data is first assembled into frame memory 70. Note that elements in FIG. 4 which are in common with FIG. 3 are assigned the same reference numbers. CRC-scrambler 72 represents the first operation performed on data with reference to rate adaptation buffer 74. CRC-scrambler 72 reads data out of frame memory 70 and writes data into rate adaptation buffer 74. An FEC encode operation represents the second operation performed on the data in rate adaptation buffer 74. To perform FEC encoding, FEC encoder 76 first reads data out of rate adaptation buffer 74 and later writes data back into rate adaptation buffer 74. The interleave operation is performed by interleaver 78 and represents the third operation. In this third operation, interleaver 78 also reads data out of rate adaptation buffer 74 and subsequently writes data back into rate adaptation buffer 74. The fourth operation associated with transmit section 62 is that performed by constellation encoder 80. In performing this function, constellation encoder 80 reads data out of rate adaptation buffer 74 and converts the data into sets of complex signals. The complex symbols are not rewritten into rate adaptation buffer 74, but rather are written to constellation output buffer 82.

Figure 5:
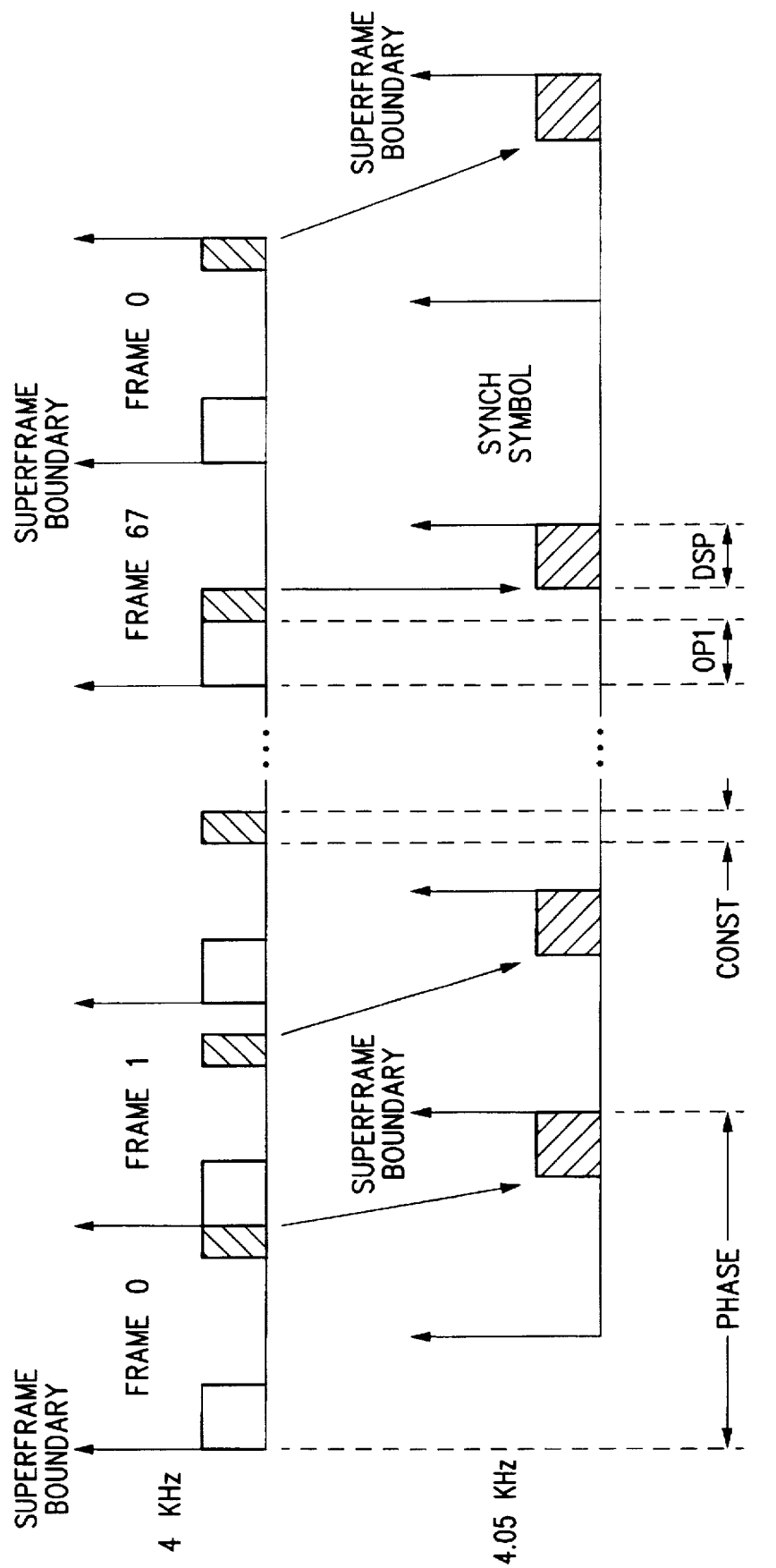
FIG. 5 illustrates a timing diagram of the signal processing operations performed on the transmit rate adaptation buffer of FIG. 3.

This sequence is used for understanding the timing constraints which are developed in FIG. 5, which illustrates a timing diagram of the transmission of a superframe of data. In FIG. 5 the upper most timing axis represents a superframe of data to be transmitted which is received at a 4 kilohertz rate. Within the superframe there are 68 frames labeled frame 0, frame 1, etc. through frames 67. Following frame 67 is a frame 0 of a succeeding frame. The time point between frame 67 and frame 0 of the next frame represents a superframe boundary. The second horizontal axis represents the reading of frames by DSP engine and peripherals 5 at the higher rate of 4.05 kilohertz. Note that there are 69 frames number 0 through 68 in the 4.05 kHz superframe. By examining the time that the four signal processing functions of FIG. 4 require, it is possible to determine a time interval labeled "PHASE" which allows transmit section 62 to synchronize the 4 kHz rate to the 4.05 kHz rate. Setting this phase value consistent with various timing constraints allows 68 frames to be received for transmission in the same amount of time that 69 frames are transmitted on a telephone line without requiring more than one frame buffer of memory in rate adaptation buffer 74.

As illustrated in FIG. 5, the PHASE value represents the difference in time between the start of a superframe received at the 4 kilohertz rate and the start of transmission of the same superframe at the 4.05 kilohertz rate. Note that FIG. 5 illustrates three other variables which relate to timing constraints as will be further described below. The first variable is an interval labeled "CONST" which represents the amount of time it takes constellation encoder 82 to compute the set of complex symbols for one frame of data. A second value labeled "OP1" represents the amount of time required for operations one, two and three as illustrated in FIG. 4. Finally, the interval labeled "DSP" represents the amount of time it takes DSP and peripherals 5 to read the contents of constellation output buffer 82.

Figure 6:
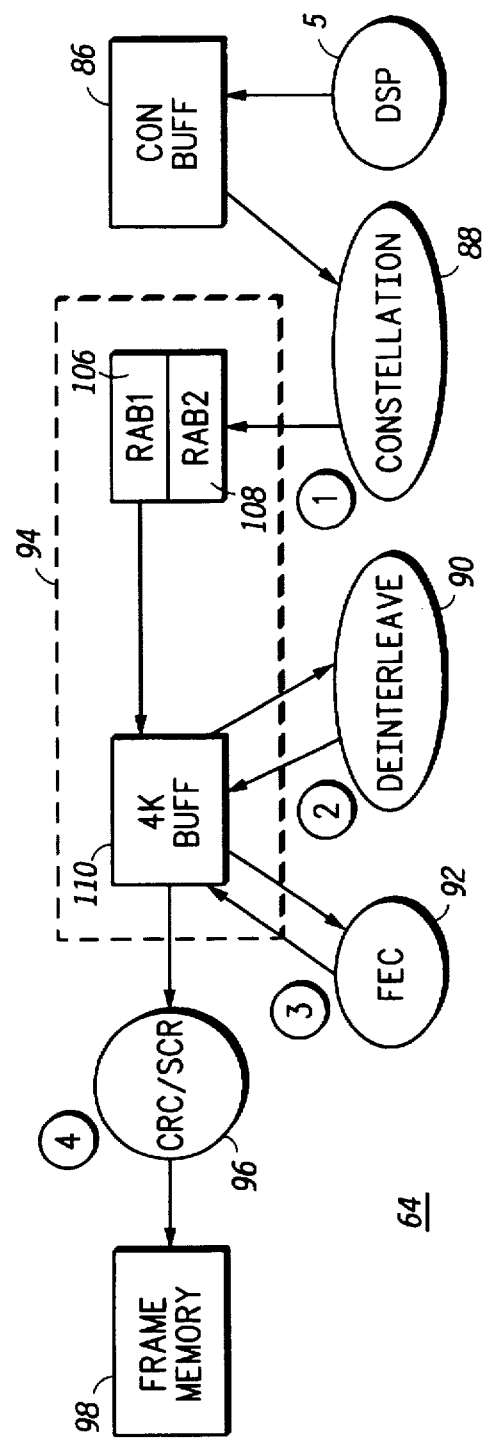
FIG. 6 illustrates, in block diagram form, the signal processing operations performed on the receive rate adaptation buffer of FIG. 3.

FIG. 6 illustrates, in block diagram form, the signal processing functions performed on data which is stored in rate adaptation buffer 94. As before, functions which are like those performed in FIG. 3 are assigned the same reference numbers. Note that as illustrated in FIG. 6, rate adaptation buffer 94 includes a first buffer 106 labeled "RAB1", a second buffer 108 labeled "RAB2" and a third 4 kHz buffer 110. Note that in FIG. 6 the sequence of operations proceeds right to left. First, DSP and peripherals 5 provide data to constellation buffer 86 at a frame rate of 4.05 kilohertz. A constellation decoder 88 then reads data from constellation buffer 86 to perform a first function and writes the data into one of RAB1 or RAB2 which are used in an alternating fashion. When constellation decoder 88 completes processing of a frame of data that frame of data is then transferred into 4 kHz buffer 110 at an appropriate time. In the illustrated embodiment, the 4 kHz buffer is an SRAM array. At this point, constellation decoder 88 starts the use of another one of RAB1 and RAB2 for the next frame. RAB1 and RAB2 are portions of a single SRAM array. This second operation by receive section 64 is the deinterleave operation 2 performed by deinterleaver 90. The deinterleave operation is performed by reading data from 4 kilohertz buffer 110 and writing data back into 4 kHz buffer 110. The third operation is the FEC decoding provided by FEC decode 92. Likewise, FEC decode 92 reads data from 4 kHz buffer 110 and writes data back into 4 kHz buffer 110. Finally, the fourth operation performed by receiver section 60 is a CRC-descrambling operation performed by CRC-descrambler 96. To perform this operation, CRC-descrambler 96 reads data out of 4 kHz buffer 110 and writes the descrambled data into frame memory 98. Note that since constellation decoder 88 must operate for an entire frame period, the receive operation is necessarily more difficult in terms of buffering than the transmit operation. In addition, the data provider is working at a faster rate and therefore will of necessity provide more data than can be handled at the slower rate. Thus, constellation decoding is performed independently on data in a different buffer from the other three operations and an additional frame buffer is required to allow storing the overflowing data arriving at the faster 4.05 kHz rate.

Figure 7:
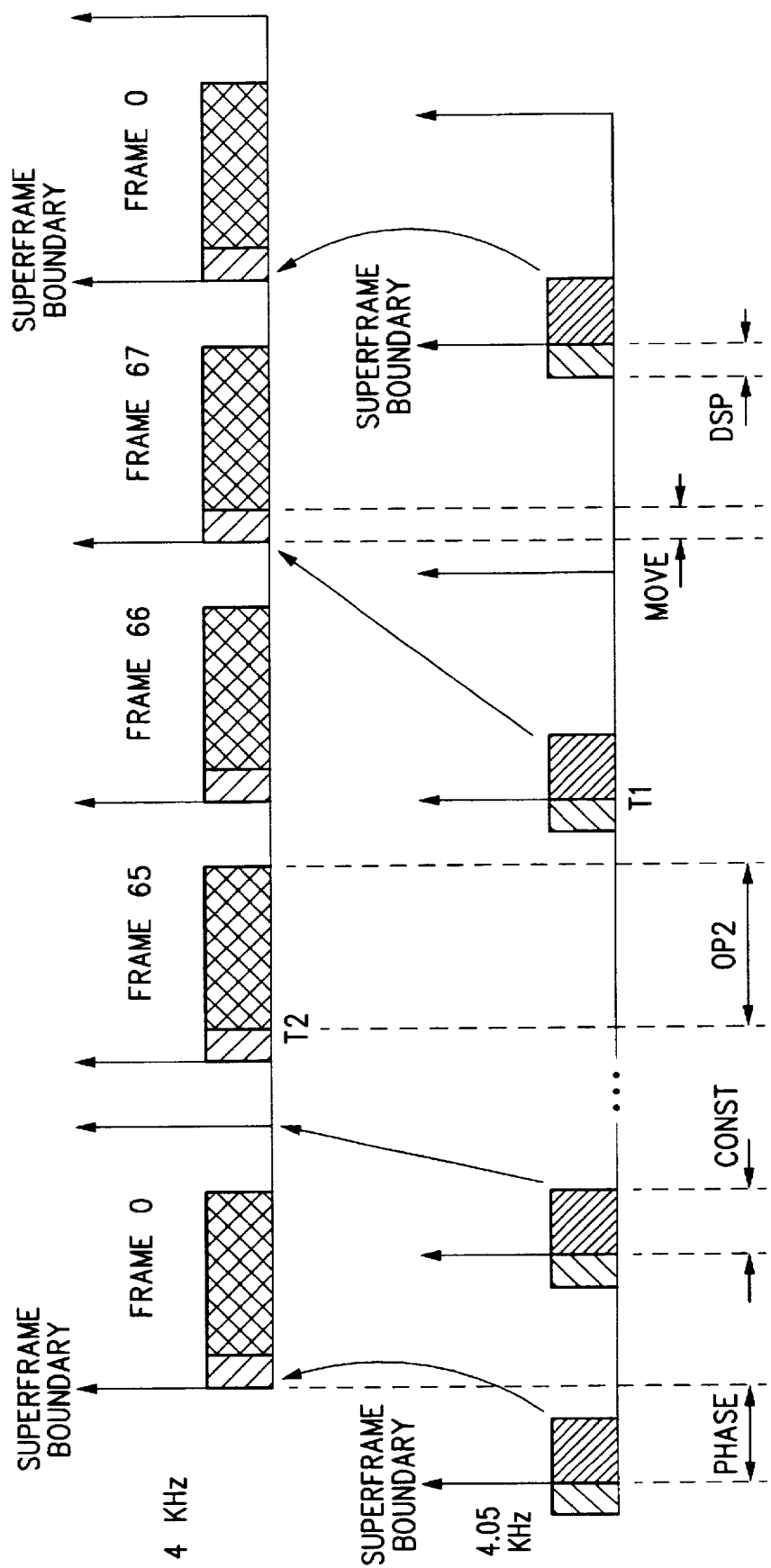
FIG. 7 illustrates a timing diagram of the signal processing operations performed on the receive rate adaptation buffer of FIG. 3.

FIG. 7 illustrates a timing diagram of the various events associated with receive section 64 which are helpful in understanding the timing constraints imposed by the various events. The first horizontal axis represents the sequence of frames received and provided to the multiple bit streams at the 4 kilohertz rate. As in FIG. 5 there are 68 frames of a superframe and individual frames in the superframe are illustrated including a superframe boundary between frame 67 and frame 0 of a subsequent superframe. The second horizontal axis represents frames received from DSP and peripherals 5 through constellation buffer 86 at the 4.05 kilohertz rate. Also, in FIG. 7 are several time durations which represent constraints imposed on the sequence of events. The first variable labeled "PHASE" is the delay between the start of the 4.05 kilohertz super frame and the start of the 4 kilohertz super frame. The second variable is labeled "CONST" and represents the period of time required for constellation decoder 88 to convert the set of symbols into constellation buffer 86 into a frame of data. A third variable labeled OP2 represents the amount of time required for the deinterleaving, FEC decoding, and CRC-descrambling operations. A fourth variable labeled MOVE represents the amount of time it takes to move a frame of data from a full one of RAB1 or RAB2 into 4 kHz buffer 110. A fifth variable labeled "DSP" represents the amount of time required by DSP and peripherals 5 to write a set of symbols into constellation buffer 86 which corresponds to a complete frame of data. In addition, FIG. 7 illustrates two time points which also form constraints.

A point in time labeled "T1" is the point in time at which the received data corresponding to frame 67 is being written into either RAB1 or RAB2. A point in time labeled "T2" is the time when a MOVE operation is completed from either RAB1 or RAB2 into the 4 kHz buffer in order to accommodate the write of received data corresponding to frame 67 into RAB1 or RAB2.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. An asymmetric digital subscriber line (ADSL) transmitter, comprising:
   a transmit frame memory for receiving a bit stream at a first rate, and storing the bit stream as a frame of data;
   a cyclic redundancy check (CRC) scrambler, coupled to the transmit frame memory, for operating on the frame of data;
   a forward error correction encoder, for performing an encoding operation on the frame of data;
   an interleaver, for selectively interleaving at least a portion of the frame of data;
   a rate adaptation buffer, coupled to the CRC-scrambler, the forward error correction encoder, and the interleaver, the rate adaptation buffer for temporarily storing the frame of data after the forward error correction encoder, the interleaver, and the CRC-scrambler operate on the frame of data to provided a modified frame of data; and
   an encoder, coupled to the rate adaptation buffer, for providing a new frame of data at a second rate different from the first rate.

2. The ADSL transmitter of claim 1, wherein the rate adaptation buffer consists of only a single random access memory.

3. The ADSL transmitter of claim 1, wherein the encoder is characterized as being a constellation encoder.

4. The ADSL transmitter of claim 1, wherein the rate adaptation buffer is for temporarily storing the frame of data for an amount of time required for the encoder to transmit a previous frame of data.

5. A method for transmitting a frame of data in a communication system, the method comprising the steps of:
   receiving the frame of data, at a first rate, in a frame memory;
   performing at least two operations on the frame of data to produce a modified frame of data, and moving the modified frame of data to a rate adaptation buffer after each of the at least two operations; and
   providing the modified frame of data to an output buffer, the output buffer providing a buffered frame of data at a second rate different from the first rate.

6. The method of claim 5, wherein the step of performing the at least two operations further comprises the steps of:
   performing a cyclic redundancy check (CRC) scrambling operation on the frame of data to produce a scrambled frame of data;
   providing the scrambled frame of data to the rate adaptation buffer;
   performing an encoding operation on the scrambled frame of data to produce a encoded scrambled frame of data;
   providing the encoded scrambled frame of data to the rate adaptation buffer; and
   performing an interleaving operation on at least a portion of the encoded scrambled frame of data to produce an interleaved encoded scrambled frame of data.

7. The method of claim 6, further comprising the steps of:
   providing the interleaved encoded scrambled frame of data to the rate adaptation buffer; and
   performing a constellation encoding operation of the interleaved encoded scrambled frame of data to produce the buffered frame of data.

8. The method of claim 7, wherein the rate adaptation buffer is cleared by the constellation encoding operation before the scrambled frame of data can be received.

9. The method of claim 7, wherein the output buffer is cleared before the constellation encoding operation is performed.

10. An asymmetric digital subscriber line (ADSL) receiver, comprising:
    a constellation decoder for receiving a frame of data at a first rate and providing a decoded frame of data;
    a rate adaptation buffer, coupled to the constellation decoder, for temporarily storing the decoded frame of data;
    a forward error correction decoder, coupled to the rate adaptation buffer, for decoding the frame of data;
    a deinterleaver, coupled to the rate adaptation buffer, for deinterleaving an interleaved portion of the frame of data;
    a cyclic redundancy check (CRC) descrambler, coupled to the rate adaptation buffer, for descrambling the frame of data to produce a descrambled frame of data; and
    a receive frame memory, coupled to the descrambler, for receiving the descrambled frame of data at a second rate, the second rate being different than the first rate.

11. The ADSL receiver of claim 10, wherein the rate adaptation buffer comprises first, second, and third portions, wherein the first and second portions alternately receive decoded frames of data from the constellation decoder, the third portion coupled to both the first and second portions and alternately receives the decoded frames of data from the first and second portions on a first in, first out basis, the third portion coupled to the CRC-descrambler, the deinterleaver, and the forward error correction decoder.

12. The ADSL receiver of claim 10, further comprises an input buffer for receiving a plurality of frames of data and coupled to the constellation decoder.

13. The ADSL receiver of claim 10, wherein the rate adaptation buffer is for temporarily storing at least one frame of data that has arrived at the rate adaptation buffer before the at least one frame of data can be operated on by the CRC-descrambler, the deinterleaver, and the forward error correction decoder.

14. A method for receiving a frame of data in a communication system, the method comprising the steps of:

receiving the frame of data, at a first rate, in an input buffer;

decoding the frame of data and providing a decoded frame of data to a rate adaptation buffer;

performing at least two operations on the frame of data to produce a modified frame of data, and moving the modified frame of data to the rate adaptation buffer after each of the at least two operations; and providing the modified frame of data to a receive frame memory, the receive frame memory providing the modified frame of data at a second rate different from the first rate.

15. The method of claim 14, further comprising a step of descrambling the modified frame of data before the step of providing the modified frame of data to the receive frame memory.

16. The method of claim 14, wherein the step of performing the at least two operations further comprises the steps of:

providing a decoded frame of data to one of a first portion or a second portion of the rate adaptation buffer;

moving the decoded frame of data to a third portion of the rate adaptation buffer from the first or the second portion;

performing a deinterleaving operation on at least a portion of the decoded frame of data to produce a deinterleaved decoded frame of data;

providing the deinterleaved decoded frame of data to third portion of the rate adaptation buffer;

performing a forward error correction decoding operation on the deinterleaved decoded frame of data to produce a decoded deinterleaved frame of data;

providing the deinterleaved decoded frame of data to the third portion of the rate adaptation buffer; and performing a cyclic redundancy check (CRC) descrambling operation on the deinterleaved decoded frame of data to produce a descrambled frame of data.

17. The method of claim 14, wherein a difference between a beginning of a first superframe at the first rate and a beginning of a second superframe at the second rate is determined by an amount of time required to perform the step of decoding the frame of data.

18. The method of claim 14, further comprising the steps of:

providing a decoded frame of data to one of a first portion or a second portion of the rate adaptation buffer; and moving the decoded frame of data to a third portion of the rate adaptation buffer from the first portion or the second portion before a new frame of data which follows the decoded frame of data by two frames.

* * * * *